April 1, 1930.  C. L. RICE  1,752,574
EGG CARRIER
Filed April 27, 1928
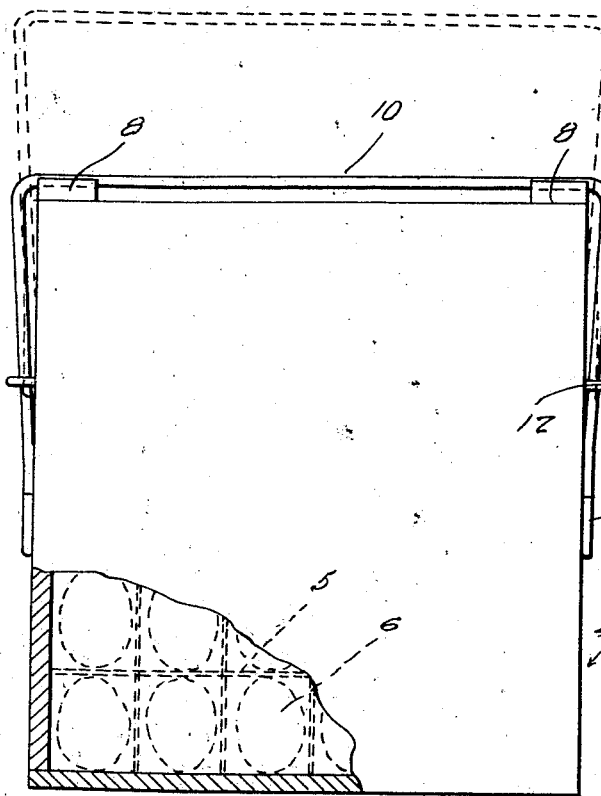
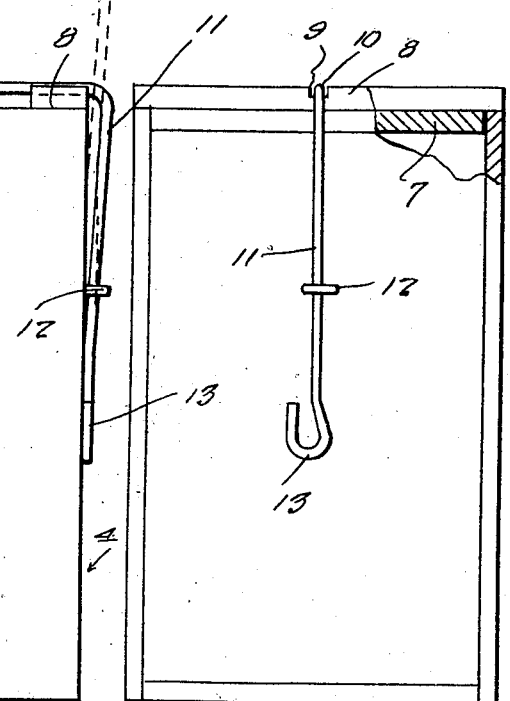
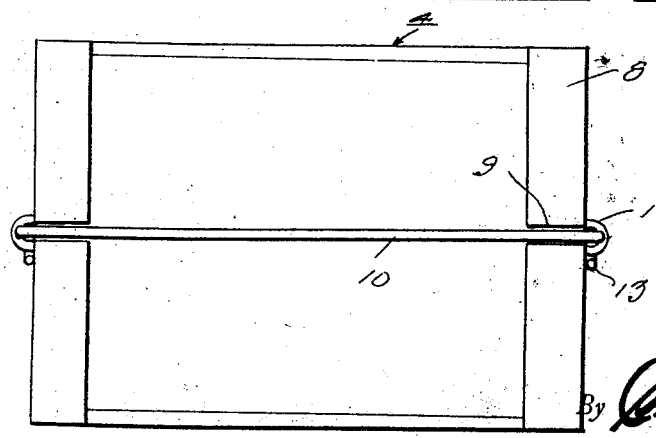
Inventor
C. L. Rice
By Clarence A. O'Brien
Attorney Patented Apr. 1, 1930

1,752,574

UNITED STATES PATENT OFFICE

CLARENCE L. RICE, OF DELTA, IOWA

EGG CARRIER

Application filed April 27, 1928. Serial No. 273,312.

This invention relates to an improved egg carrier in the form of a small portable receptacle to be constructed to receive ordinary partition or cell units, for accommodating two or three dozen eggs.

More specifically, the invention has reference to a small box-like receptacle, which is of a shape and size to permit it to be conveniently placed in an automobile in a convenient and out of the way position, the same being provided with a novel removable cover and a slidably mounted carrying bail which is constructed to have the additional function of a retainer for the cover.

Other features and advantages of the invention will become more readily apparent from the following description and drawings.

In the drawings:—

Figure 1 is a view in section and elevation of an egg carrier constructed in accordance with the present invention.

Fig. 2 is an end view of the same with portions broken away.

Fig. 3 is a top plan view of either Figs. 1 or 2.

Referring now to the drawings by reference numerals, it will be observed that the box-like container or receptacle generally designated by the reference character 4, this being of somewhat rectangular form and open at its top. This box is made to accommodate two or three dozen eggs.

In practice, I employ ordinary partitions or cellular fillers, as shown in dotted lines by the reference character 5, which provides the ordinary pocket for the eggs 6. The removable cover 7 fits down into the upper portion of the box, and carries transverse cleats 8, the end portions of which rest upon the upper edges of the side walls of the box.

Each cleat is formed at its center with a notch 9 functioning as a keeper seat. These keeper seats receive the handle or bight portion 10 of a substantially U-shaped wire bail. The downturned arm portion 11 extend down through guide eyes 12, and the end walls of the box terminate in retaining hooks 13. With this arrangement, the bail can be moved down to the full line position shown in Fig. 1, at which time it operates as a retainer for the cover, or it may be lifted up to the dotted line position as shown, so that the hook 13 can be engaged with the eye bolt 12, to provide a carrying handle or bail.

The simplicity of construction is such as to obviate the necessity of incorporating a more lengthy description, it being thought that the present description, read in connection with the drawings, will enable persons skilled in the art to which the invention relates to obtain a clear understanding to appreciate the advantages which are evident.

Minor changes in shape, size, and rearrangement of parts coming within the field of invention claimed may be resorted to if desired.

Having thus described my invention, what I claim as new is:—

An egg carrier comprising a box like container open at its top, a removable cover fitting down between the side walls of the container, transverse cleats carried by the outer surface of said cover and having their end portions extending beyond the edges of the cover and resting upon the upper edges of the side walls of the container, said cleats being further provided with transverse notches formed thereon intermediate the ends of the cleats together with a substantially U-shaped bail, the downturned end portions of which are slidably engaged with the container and whose bight portion is receivable in said notches.

In testimony whereof I affix my signature.

CLARENCE L. RICE.